United States Patent
Company

(10) Patent No.: US 8,965,335 B2
(45) Date of Patent: Feb. 24, 2015

(54) DETECTOR OF UPLINK FREQUENCIES WITH FEEDBACK

(76) Inventor: Steven Leo Company, Boynton Beach, FL (US)

( * ) Notice: Subject to any disclaimer, the term of this patent is extended or adjusted under 35 U.S.C. 154(b) by 0 days.

(21) Appl. No.: 13/353,298

(22) Filed: Jan. 18, 2012

(65) Prior Publication Data

US 2013/0183931 A1    Jul. 18, 2013

(51) Int. Cl.
*H04W 12/12*  (2009.01)
*H04M 1/66*   (2006.01)

(52) U.S. Cl.
USPC ............................ 455/410; 455/411

(58) Field of Classification Search
USPC ................................ 455/410, 411
See application file for complete search history.

(56) References Cited

U.S. PATENT DOCUMENTS

| | | | | |
|---|---|---|---|---|
| 2004/0166802 | A1* | 8/2004 | McKay et al. | 455/15 |
| 2006/0038677 | A1* | 2/2006 | Diener et al. | 340/540 |
| 2006/0073800 | A1* | 4/2006 | Johnson et al. | 455/182.3 |
| 2011/0210843 | A1* | 9/2011 | Kummetz | 340/517 |
| 2011/0267976 | A1* | 11/2011 | Oodachi et al. | 370/252 |

* cited by examiner

*Primary Examiner* — Marisol Figueroa
*Assistant Examiner* — Jean Chang

(57) ABSTRACT

An apparatus and method for detection of uplink frequencies from a mobile device, such as a cell phone, may be used as an alarm for people not to use their mobile device, or may signal security personnel when an unauthorized mobile device is being used. The apparatus and method may measure the uplink frequency band and use feedback with the downlink frequencies to gain a better reading of the distance the mobile device being used is from the detection device The apparatus and method has more precision of distance compared to conventional detectors, as the uplink RF power of a mobile device changes depending where it's located from the cell tower transmitting the downlink data to the mobile device monitored.

10 Claims, 1 Drawing Sheet

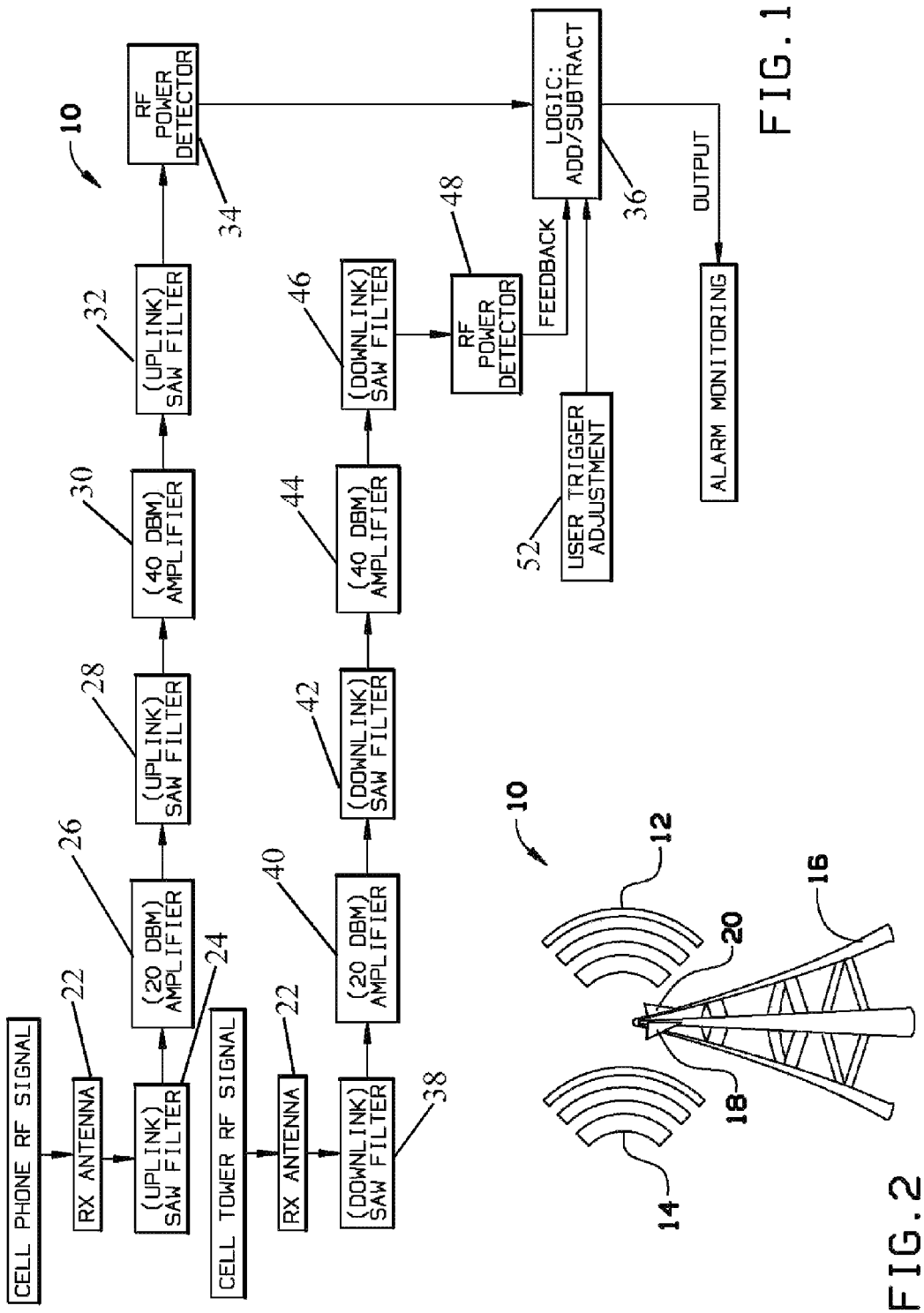

DETECTOR OF UPLINK FREQUENCIES WITH FEEDBACK

BACKGROUND OF THE INVENTION

The present invention relates to mobile device use detection and, more particularly, to a detector of mobile device uplink frequencies with feedback with downlink frequencies.

Cellular communication standards, such as Global System for Mobile Communication (GSM), include the concept of creating an interconnection between roaming mobile units (or mobile phones) and Base Transceiver Station (BTS) towers, which indicate the source of coverage for a limited geographical area called a "cell." This interconnection between mobile units and the BTS tower is based upon simultaneous transmission and reception of data packets from each other on different unique frequencies, known as uplink and downlink frequencies.

The term uplink frequency is used for a band of frequencies dedicated for transmitting data from mobile units to the Receiver of BTS/cell towers. The uplink frequency in a GSM network, for example, the 1900 MHz Frequency Band has a range of 1850 to 1910 megahertz (MHz).

The downlink frequency refers to the transmitting frequency from the BTS/cell tower antenna to the Receiver of mobile unit on ground or air. This frequency, in a GSM network, for example, 1900 MHz Frequency band has a range of 1930 to 1990 MHz.

It can be useful to detect the presence of a uplink frequency signal, as some places may prohibit the use of cell phones. For example, in areas of security, such as banks, schools, workplaces, airplanes, police stations or the like, the use of cell phones may be prohibited or also as a distraction for children in their homes.

Current detection systems, however, do not have enough amplification to read the signal within a power ratio of −95 decibels (referenced to one milliwatt-dBm) to 15 dbm. Current detection systems also do not have a mechanism to determine the distance with precision between the product antenna and the device that is transmitting the uplink frequencies, which will cause a false distant detection.

As can be seen, there is a need for an improved detector of uplink frequencies.

SUMMARY OF THE INVENTION

In one aspect of the present invention, a device to detect use of a mobile device comprises at least one antenna for detecting a mobile device uplink signal and for detecting a cell tower downlink signal; a plurality of uplink filters and uplink amplifiers for enhancing the mobile device uplink signal detected by the at least one antenna; an uplink power detector for detecting the enhanced mobile device uplink signal; a plurality of downlink filters and downlink amplifiers for enhancing the cell tower downlink signal; a downlink power detector for detecting the enhanced cell tower downlink signal; and a logic circuit for receiving an output from the uplink power detector and an output from the downlink power detector and determine whether an unauthorized mobile device is being used.

In another aspect of the present invention, a method for detecting use of a mobile device comprises detecting a mobile device uplink signal; detecting a cell tower downlink signal; enhancing the mobile device uplink signal with a plurality of uplink filters and uplink amplifiers; detecting the enhanced mobile device uplink signal with an uplink power detector; enhancing the cell tower downlink signal with a plurality of downlink filters and downlink amplifiers; detecting the enhanced cell tower downlink signal with a downlink power detector; and receiving an output from the uplink power detector and an output from the downlink power detector with a logic circuit to determine whether an unauthorized mobile device is being used in a determine zone.

These and other features, aspects and advantages of the present invention will become better understood with reference to the following drawings, description and claims.

BRIEF DESCRIPTION OF THE DRAWINGS

FIG. 1 is a flow chart schematically describing a detection method and apparatus according to an exemplary embodiment of the present invention; and FIG. 2 is a schematic representation of a cell tower receiving uplink signals and sending downlink signals.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides an apparatus and method for detection of uplink frequencies from a mobile device, such as a cell phone, that may be used as an alarm for people not to use their mobile device, or that may signal security personnel when an unauthorized mobile device is being used. The apparatus and method may measure the uplink frequency band and use feedback with the downlink frequencies to gain a better reading of the distance the mobile device being used is from the detection device.

Referring to FIGS. 1 and 2, a mobile device uplink frequency signal 14 may be sent from a mobile device to a receive antenna 18 on a mobile device tower 16 when in use. This signal 14 may be received by an antenna 22 of a detection device 10 for detecting mobile device use. The signal 14 may pass through an uplink surface acoustic wave (SAW) filter 24, through a first uplink amplifier 28, typically a 20 dBm amplifier, then through another uplink SAW filter 28 and a second uplink amplifier 30, typically a 40 dBm amplifier, then through a third SAW filter 32 and finally to an uplink RF power detector 34. The uplink power detector 34 may detect the presence of a mobile device transmission signal (uplink frequency signal) from −95 dBm to 15 dBm.

A mobile device downlink frequency signal 12 may be send from a transmit antenna 20 from the mobile device tower 16 to the mobile device. The detection device 10 may receive this signal via the antenna 22. This antenna 22 may be the same or different from the antenna 22 described in the above paragraph. The signal 12 may pass through an downlink SAW filter 38, through a first downlink amplifier 40, typically a 20 dBm amplifier, then through another uplink SAW filter 42 and a second downlink amplifier 44, typically a 40 dBm amplifier, then through a third SAW filter 46 and finally to a downlink RF power detector 48.

A logic circuit 36 compares the signal from the uplink power detector 34 and the downlink power detector 48 to help determine the distance the mobile device is away from the device 10. This comparison has more precision of distance as the uplink RF power of a mobile device changes depending where it's located from the cell tower transmitting the downlink data to the mobile device. For example, if someone are near a cell tower, the uplink RF of the cell phone can be from about −95 to −80 dbm (this also depends the power of the TX (downlink) on the cell tower). However, if someone is approximately one mile from the cell tower, the uplink RF of the cell phone can be from −30 to −20 dbm. Therefore, there is not a constant uplink RF signal. The cell phone adjusts automatically the uplink RF power depending on the downlink received.

The logic circuit 36 may output an alarm monitoring signal to sound an alarm, for example, when a mobile device signal is detected in a determine area. A user trigger adjustment 52 may be used to adjust logic circuit 36. For example, a user may change the detection distance range, the detection signal strength required for trigger, or the like.

It should be understood, of course, that the foregoing relates to exemplary embodiments of the invention and that modifications may be made without departing from the spirit and scope of the invention as set forth in the following claims.

What is claimed is:

1. A device to detect use of a mobile device without altering an uplink signal and a downlink signal associated with the use of the mobile device, comprising:
    at least one antenna for detecting a mobile device uplink signal and for detecting a cell tower downlink signal;
    a plurality of uplink filters and uplink amplifiers for enhancing the mobile device uplink signal detected by the at least one antenna;
    an uplink power detector for detecting the enhanced mobile device uplink signal;
    a plurality of downlink filters and downlink amplifiers for enhancing the cell tower downlink signal;
    a downlink power detector for detecting the enhanced cell tower downlink signal; and
    a logic circuit comparing an output from the uplink power detector with an output from the downlink power detector to determine whether an unauthorized mobile device is being used in a predefined area.

2. The device of claim 1, wherein the uplink amplifiers include a 20 dBm amplifier in series with a 40 dBm amplifier with a saw filter in between.

3. The device of claim 2, wherein the downlink amplifiers include a 20 dBm amplifier in series with a 40 dBm amplifier with a saw filter in between.

4. The device of claim 1, further comprising an alarm output signaling the unauthorized mobile device being used within the predefined area.

5. The device of claim 1, wherein the downlink filters include surface acoustic wave filters.

6. The device of claim 1, wherein the uplink filters include surface acoustic wave filters.

7. The device of claim 1, further comprising a user trigger adjustment for adjusting settings of the logic circuit.

8. A method for detecting use of a mobile device without altering an uplink signal and a downlink signal associated with the use of the mobile device, comprising:
    detecting a mobile device uplink signal;
    detecting a cell tower downlink signal;
    enhancing the mobile device uplink signal with at least one uplink filter and at least one uplink amplifier;
    detecting the enhanced mobile device uplink signal with an uplink power detector;
    enhancing the cell tower downlink signal with at least one downlink filter and at least one downlink amplifier;
    detecting the enhanced cell tower downlink signal with a downlink power detector; and
    comparing an output from the uplink power detector with an output from the downlink power detector with a logic circuit to determine whether an unauthorized mobile device is being used in an area.

9. The method of claim 8, further comprising sending an alarm signal when the unauthorized mobile device is detected as being in-use.

10. The method of claim 8, further comprising adjusting settings of the logic circuit with a user trigger adjustment.

* * * * *